US009030470B2

(12) United States Patent
Wang et al.

(10) Patent No.: US 9,030,470 B2
(45) Date of Patent: May 12, 2015

(54) METHOD AND SYSTEM FOR RAPID THREE-DIMENSIONAL SHAPE MEASUREMENT

(75) Inventors: Zhao Wang, Hong Kong (CN); Ying Liu, Hong Kong (CN)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 331 days.

(21) Appl. No.: 13/585,807

(22) Filed: Aug. 14, 2012

(65) Prior Publication Data

US 2014/0049535 A1 Feb. 20, 2014

(51) Int. Cl.
*G06T 15/00* (2011.01)
*G09G 5/02* (2006.01)
*G06K 9/62* (2006.01)
*G01B 11/25* (2006.01)

(52) U.S. Cl.
CPC .................................. *G01B 11/2509* (2013.01)

(58) Field of Classification Search
None
See application file for complete search history.

(56) References Cited

U.S. PATENT DOCUMENTS 6,341,016 B1 1/2002 Malione
7,456,842 B2 * 11/2008 Kosolapov .................... 345/589
2003/0026475 A1 * 2/2003 Yahashi et al. ................ 382/154
2007/0085849 A1 * 4/2007 Kosolapov .................... 345/419
2007/0211258 A1 * 9/2007 Lee et al. ....................... 356/605
2008/0073487 A1 * 3/2008 Brock et al. ............... 250/208.1
2009/0161966 A1 * 6/2009 Lim .............................. 382/209

OTHER PUBLICATIONS

Chen, Chu-Song, et al., "Range data acquisition using color structured lighting and stereo vision", Image and Vision Computing 15.6 (1997): 445-456.*
Jordi Pagès et al., "Optimised De Bruijn patterns for one-shot shape acquisition", Image and Vision Computing 23.8 (2005): 707-720).*

* cited by examiner

*Primary Examiner* — Joni Richer
*Assistant Examiner* — Yi Wang
(74) *Attorney, Agent, or Firm* — Eagle IP Limited; Jacqueline C. Lui

(57) ABSTRACT

The present invention discloses a non-contact measurement system for measuring the three-dimensional (3D) shape of an object rapidly by using a unique light pattern and the implementation method thereof. The system comprises a pattern generation unit, a projection unit, a sensing unit and a processing unit. The pattern generation unit generates an enhanced color sequence according to predetermined rules. The sensing unit of the system comprises a hybrid sensor which can be operated in fast mode or precise mode. A dedicated decoding method for the present invention is also disclosed.

19 Claims, 13 Drawing Sheets

(a)

(b)

(a)          (b)

Fast-mode with beam-splitter (a)

Precise-mode with folding mirror (b)

METHOD AND SYSTEM FOR RAPID THREE-DIMENSIONAL SHAPE MEASUREMENT

FIELD OF INVENTION

This invention relates to a measurement device, and in particular a non-contact measurement device for measuring the three-dimensional (3D) shape of an object rapidly by using a unique light pattern.

BACKGROUND OF INVENTION

Three dimension (3D) measuring technology is widely used in various industries to measure the coordinates of the surface of a 3D object. There are different approaches used for measuring the 3D shapes of different objects. For example, a coordinate measuring machine (CMM) is a 3D device for measuring the physical geometrical characteristics of an object. Laser point/line scanner is another example of a 3D measuring device. However, these 3D measuring devices are usually large in size and are not suitable to be used in living objects.

Another approach is to apply computer vision/image processing techniques to tackle this problem. In this so called 'structured light technique', a light pattern is emitted onto the object, a camera or light sensing device is positioned nearby to capture the image of the light pattern after it is reflected by the object. The captured two dimensional (2D) image is a distorted version of the original light pattern. The distortion is caused by the 3D surface of the object. When the coordinates of the light source and the camera positions are known, the surface coordinates of the 3D object can be readily computed based on the distorted 2D light pattern.

Earlier systems make use of a light pattern comprising alternating black and white stripes. In order to achieve high resolution, the width of each black or white stripe needs to be small, which means that there are many black and white stripes in the light pattern. However, due to imperfection of edge detection in image processing, the potential high curvature of the 3D object surface, and other system noises, the system may not reliably detect the black and white lines of the reflected 2D image. In practice, some edge points could be missed and other edge points could be falsely assigned to the wrong edge lines. Such false association introduces gross errors in 3D measurement. One approach to alleviate this problem is to project a sequence of black-and-white-stripe light patterns onto the object as shown in FIG. 1. The first light pattern 2 has only one white and one black stripe. Then progressively more and more white and black stripes are projected in subsequent light patterns 4. The drawback of this approach is that multiple steps of image projection, capturing and analysis are needed, rendering it time consuming in processing.

Another approach is to use color stripes to construct the light pattern. This alleviates the edge line association problem as mentioned above. However, the color stripes of the captured image depend not only on the color stripes of the light pattern that is to project onto the object, but also on the color absorption characteristic of the 3D object surface. For example, if there is a wide red color patch somewhere on the surface of the 3D object, the edge line boundary of a red stripe shone on that patch would hardly be detectable. Hence, there is a need to develop a new light pattern and its associated detection algorithm for providing fast and reliable 3D surface measurement.

SUMMARY OF INVENTION

In the light of the foregoing background, it is an object of the present invention to provide an alternate approach for 3D surface measurement. It includes a novel light pattern design methodology as well as its associated detection algorithm.

Accordingly, the present invention, in one aspect, is a method for composing an enhanced color sequence for projecting onto an object to measure three-dimensional shape of the object. The method comprises the steps of: (a) generating at least one distinctive tuple by concatenating at least one color stripe together; each distinctive tuple being different from each other; (b) forming a sequence of color stripes by using the at least one distinctive tuple based on a predetermined rule; (c) selecting two high contrast color stripes having a relatively high color contrast to each color stripe of the at least one distinctive tuple; (d) inserting one of the two high contrast color stripes into each side of each distinctive tuple with the one of the two high contrast color stripes being selected as having a maximum color gradient to a color stripe at a corresponding end of each tuple; (e) identifying a plurality of repetition positions, each of which is in the middle of two consecutive identical high contrast color stripes; and (f) further inserting a high contrast color stripe different from the two consecutive identical high contrast color stripes from the two high contrast stripes into the plurality of repetition positions to form the enhanced color sequence. In one embodiment, the method further comprises giving a unique first addressing code to each distinctive tuple in the sequence of color stripes and giving a unique second addressing code to each high contrast color stripe in the enhanced color sequence based on the unique first addressing code. In a further embodiment, the predetermined rule is De Bruijn sequence.

In yet another embodiment, the at least one color stripe is selected from a pool of color stripes and each color stripe from the pool has different color spectrum but does not contain the color of the two high contrast color stripes. The two high contrast color stripes are white stripe and black stripe respectively.

In another aspect, the present invention is a method for measuring three-dimensional shape of an object by using the enhanced color stripe mentioned above. The method comprises the steps of: (a) generating the enhanced color stripe by a pattern generation unit; (b) emitting the enhanced color stripe onto the object by a projection unit; (c) capturing at least one image of the enhanced color stripe reflected from the object by a sensing unit; and (d) determining the three-dimensional shape of the object based on the at least one image by a processing unit.

In a further embodiment, the determining step of the method for measuring the 3D shape of the object comprises the steps of: (a) identifying edges in the at least one image based on color transitions of the at least one image by an edge detection unit; (b) comparing the edge with corresponding edges in the enhanced color sequence and determining depth deviation therebetween by an analysis unit; and (c) measuring the three-dimensional shape of the object based on the depth deviation by a measurement unit.

In one embodiment, the identifying step further comprises the step of identifying normal color edges of the at least one distinctive tuple and high contrast color edges of the plurality of high contrast color stripes based on a segmentation algorithm. The comparing step further comprises the step of assigning a first index to every normal color edge, and assigning a second index to every high contrast color edge based on the first index. The comparing step further comprises the step of mapping the first index and the second index to the corresponding first addressing code and second addressing code respectively to obtain an association relationship. The depth deviation is determined based on the association relationship.

In another aspect, the present invention is an enhanced color sequence for projecting onto an object to measure three-dimensional shape of the object. The enhanced color sequence comprises (a) at least one distinctive tuple, each at least one distinctive tuple being generated by concatenating at least one color stripe together; and (b) a plurality of high contrast color stripes having a relatively high color contrast to each color stripe in the at least one distinctive tuple; wherein one of the plurality of high contrast color stripes is inserted in each side of each at least one distinctive tuple. Maximum color gradient criterion is used to select a high contrast color stripe to insert at each side of each of the distinctive tuple. In the middle of two consecutive identical high contrast color stripes, a high contrast color stripe different from the two consecutive identical high contrast color stripes in the plurality of high color contrast stripes is inserted.

In yet another embodiment, the at least one color stripe comprise a blue stripe, a green stripe, a cyan stripe, a red stripe, a magenta stripe and a yellow stripe. The plurality of high contrast color stripes comprises a white stripe and a black stripe.

In a further aspect, the present invention is a system for measuring three-dimensional shape of an object by using the enhanced color stripe mentioned above. The system comprises: (a) a pattern generation unit for generating the enhanced color stripe; (b) a projection unit for emitting the enhanced color stripe onto the object; (c) a sensing unit for capturing at least one image of the enhanced color stripe reflected from the object; and (d) a processing unit for determining the three-dimensional shape of the object based on the at least one image.

In one embodiment, the plurality of high contrast color stripes in the enhanced color stripe of the system comprises a white stripe and a black stripe. In a further embodiment, the sensing unit comprises a color sensor for capturing a color image of the enhanced color sequence reflected from the object and a monochrome sensor for capturing a monochrome image of the enhanced color sequence reflected from the object.

In yet another embodiment, the sensing unit further comprises a beam splitter for splitting light reflected from the object into a first beam and a second beam, and directing said first beam onto the color sensor and directing the second beam onto the monochrome sensor. In another embodiment, the sensing unit further comprises a folding mirror for first guiding light reflected from the object onto the monochrome sensor and then guiding the light reflected from the object onto the color sensor.

In a further embodiment, each at least one distinctive tuple is given a unique first addressing code and each plurality of high contrast color stripes is given a unique second addressing code based on the unique first addressing code. In another embodiment, the processing unit comprises: (a) an edge detection unit for identifying edges in the at least one image based on color transitions of the at least one image; (b) an analysis unit for comparing the edges with corresponding edges in the enhanced color sequence and determining depth deviation therebetween; and (c) a measurement unit for measuring said three-dimensional shape of the object based on the depth deviation.

In yet another embodiment, the edge detection unit further comprises an identification unit for identifying normal color edges and high color contrast edges based a segmentation algorithm. In a further embodiment, the analysis unit assigns a first index to every normal color edge, and assigns a second index to every high color contrast edge based on the first index. In another embodiment, the analysis unit maps the first index and the second index to the corresponding first addressing code and second addressing code respectively to obtain an association relationship. The depth deviation is determined based on the association relationship.

There are many advantages to the present invention. Firstly, the 3D measurement can be achieved by taking a single shot of the object overlaid by the enhanced color sequence projected onto it, resulting in a fast measurement speed. Secondly, black or white stripes provides more robust and stable for edge detection while a unique sequence of color stripes provides an addressing scheme to uniquely identify the color stripes. This can be exploited by the decoding unit to resolve the edge line association problem. The novel approach of inserting high contrast stripes such as a black stripe or a white stripe onto a normal color sequence enables the inserted stripes to be uniquely addressed using the first address code of the normal color stripe sequence. As a result, each light stripe in the enhanced color sequence can be uniquely identified. Thus the enhanced color stripe combines the advantages of both the monotonic black and white stripes sequence and the normal color stripes sequence for 3D measurement of an object.

Moreover, the present invention adopts the hybrid sensor approach for capturing the images. The 3D coordinates of the object is calculated from both the color image and the black and white image. More details of the object can be obtained from the result and thus a better 3D reconstruction is accomplished.

DETAILED DESCRIPTION OF THE PREFERRED EMBODIMENTS

As used herein and in the claims, "comprising" means including the following elements but not excluding others.

"Couple" or "connect" refers to electrical coupling or connection either directly or indirectly via one or more electrical means unless otherwise stated.

Throughout this specification, the RGB color model is used for ease to disclose the inventive ideas. It is clear that other color models such as CMYK color model, RYB color model, and HSV model can also be used. In the RGB color model, color is represented by a triplet of red, green and blue values. Furthermore, the value takes on an unsigned integer having a range between 0 to 255. Hence black is represented by [0,0,0] and white color is [255, 255, 255]. Other colors take on different values within this range. For example, blue, yellow, magenta, green, red and cyan colors take on RGB values (0, 0, 255), (255, 255, 0), (255, 0, 255), (0, 255, 0), (255, 0, 0) and (0, 255, 255) respectively.

Figure 1:
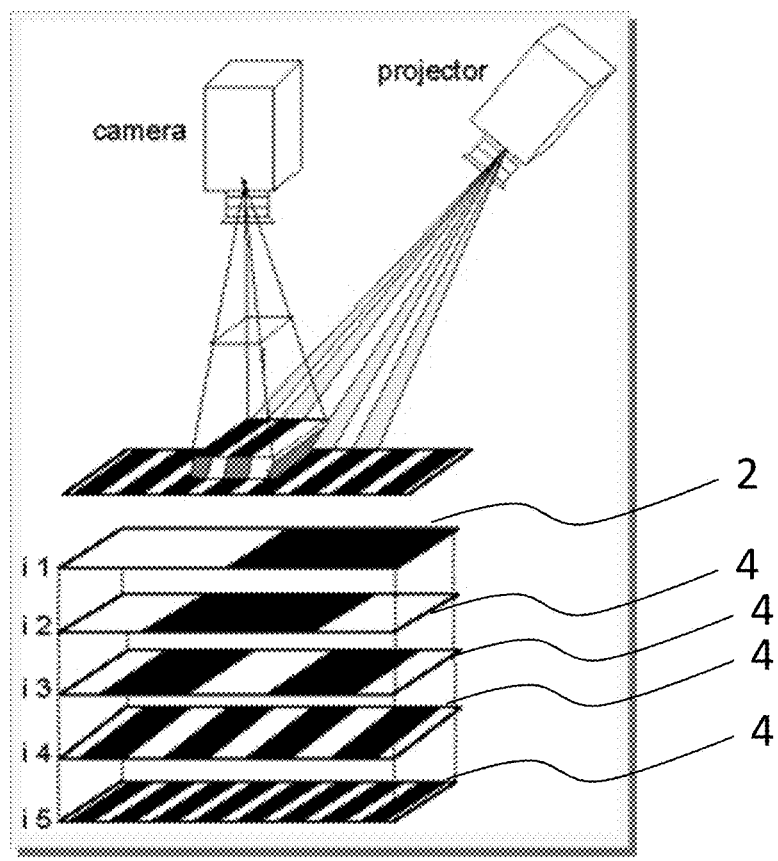
FIG. 1 is an example of a 3D measurement system.
Figure 2:
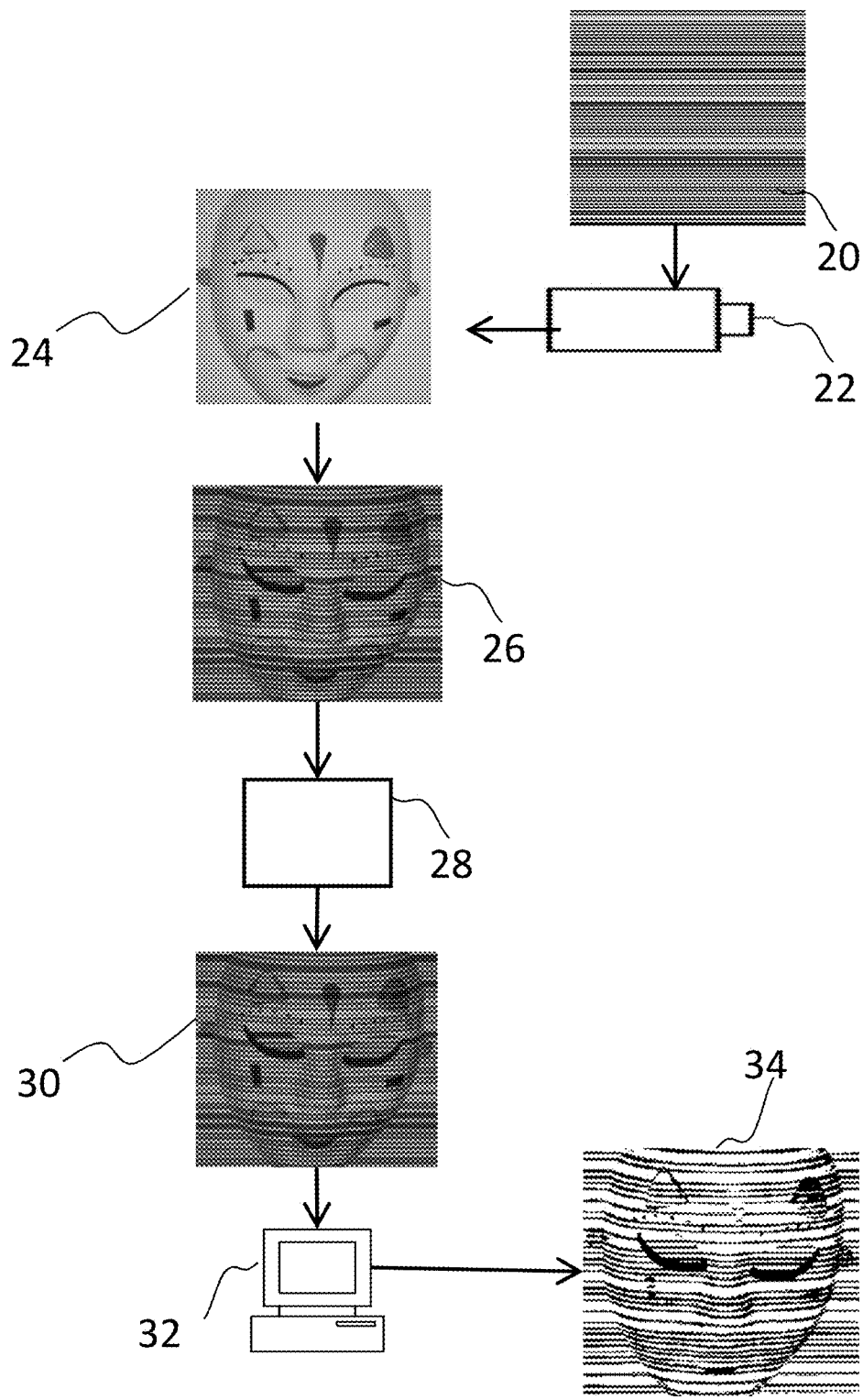
FIG. 2 illustrates how 3D measurement is performed, according one embodiment of the present invention.

The present invention makes use of a unique light pattern for measuring the 3D shape of an object. Referring now to FIG. 2, the general concept of the present invention is shown. First, a unique light pattern 20 is generated by a pattern generation unit and is projected onto an object 24 by a projection unit 22. In one embodiment the projection unit is a light projector. In an embodiment shown in FIG. 2, the light pattern comprises a plurality of light stripes. The original light pattern 20 overlays onto the object 24, resulting a 'pattern projected object' 26. Then an image sensor of a sensing unit 28 is used to capture the image of the pattern projected object 26. In one embodiment, at least one captured image 30 is acquired. Afterward, the captured image 30 is processed by a processing unit such as a computer 32 to obtain a set of decoded stripes 34. The 3D shape of the object 24 is then obtained through further processing of the decoded stripes 34. In another embodiment, the pattern generation unit and the processing unit 32 are connected together so that data exchange can be performed therebetween. In a further embodiment, the pattern generation unit, the project unit, the sensing unit and the processing unit are all hosted by the same computer 32.

Figure 3:
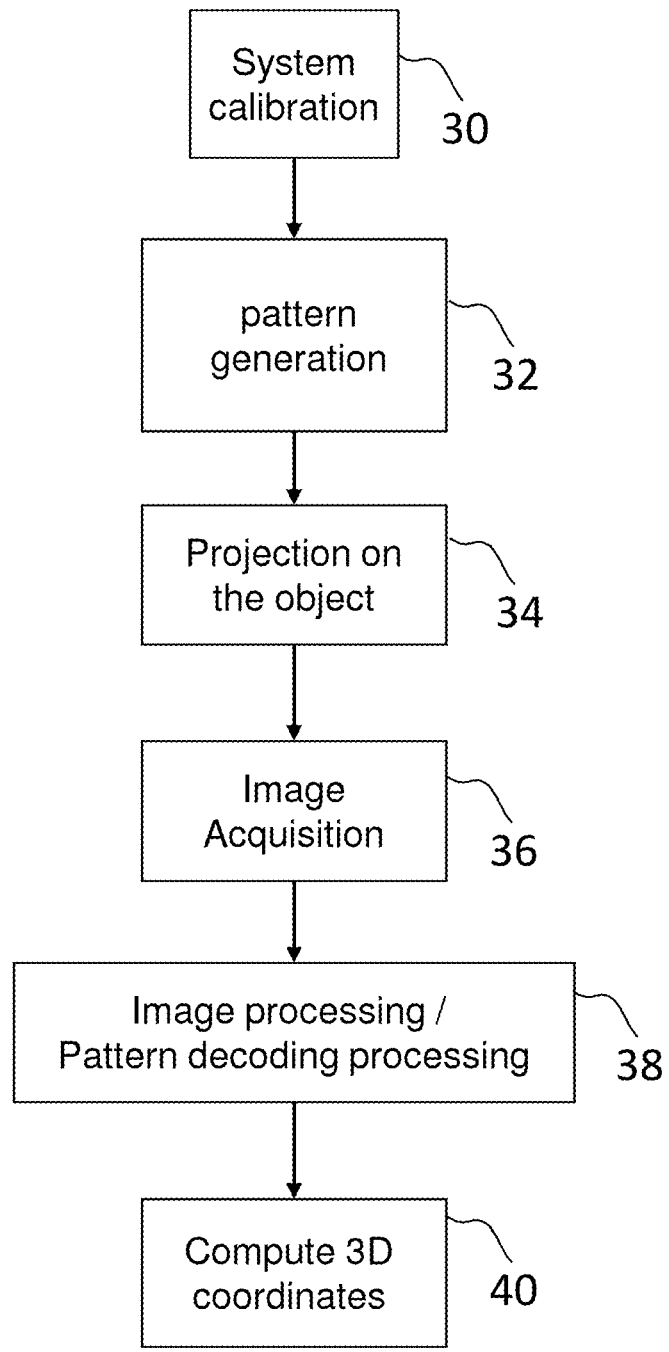
FIG. 3 is whole process flow of the present invention according to one embodiment.

Referring now to FIG. 3, the whole process flow of the present invention is shown. First, system parameters are initiated and the relative positions of the projector and the image sensor are obtained in the system calibration step 30. In one embodiment, the calibration involves obtaining the 3D coordinates of the center of the projector, the center of the image sensor as well as the distance between them. Other parameters such as the characteristics of the projector and image sensor, their respective focal lengths, principle point, skew coefficient and distortion coefficients may also be acquired. Furthermore, the relationship between the camera and projector may also be established, such as the rotation and translation matrices. These parameters are used subsequently for the triangulation computation to determine the 3D coordinate of the object surface (to be described later). The color calibration step is also done in step 30 so as to perform a mapping between the captured color and the projected color. In step 32, a unique light pattern is generated based on pre-defined rules and the light pattern is encoded using a predetermined method. Then the light pattern is projected onto an object in step 34. In step 36, the image of the pattern projected object 26 (refer to FIG. 2) is captured by using image sensors such as a charge-coupled device (CCD) or a complementary metal-oxide-semiconductor (CMOS) camera. After acquiring the image, image processing and pattern decoding are done in step 38. Based on the decoding result, the 3D coordinates of the surface points of the object are calculated in step 40 and then the 3D shape of the object is reconstructed according to these 3D coordinates. These steps are elaborated in details in paragraphs below.

Figure 4:
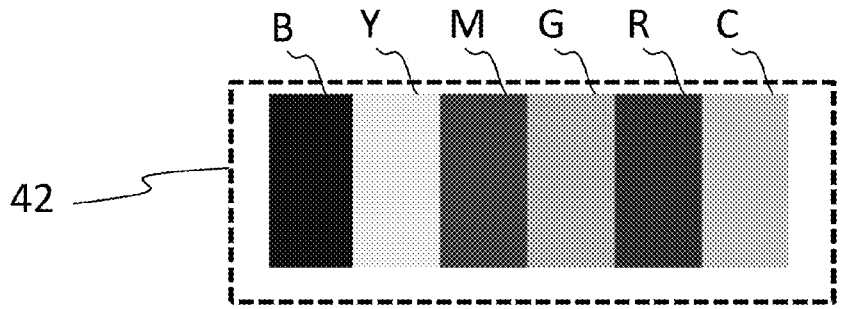
FIG. 4 shows an exemplary light pattern according to one embodiment of the present invention.
Figure 4:
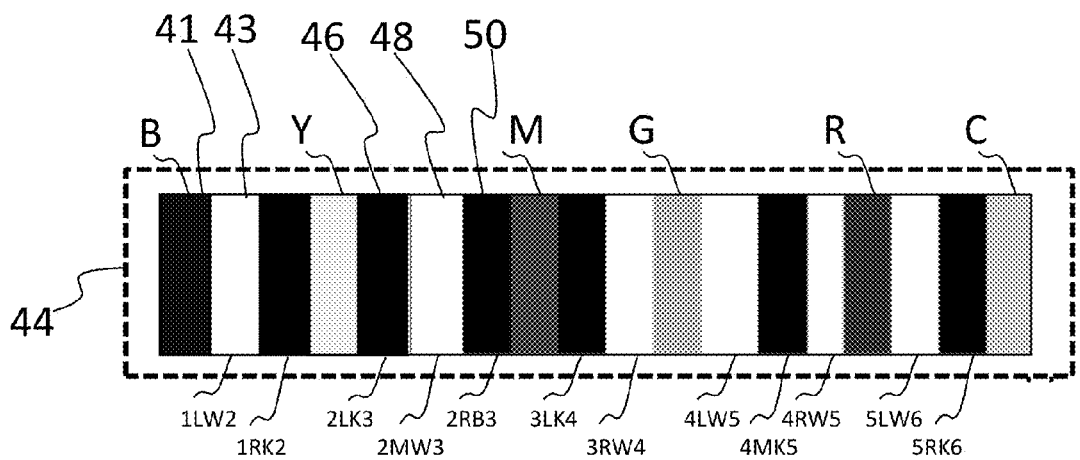

In the pattern generation step 32, a set of colors covering different color spectrum are first chosen to form color stripes. The orientation of the stripe is not important in this invention. They can be a horizontal stripes as shown in FIG. 2 or vertical stripes as shown in FIG. 4. Other orientation is also possible. Referring to FIG. 4, an exemplary light pattern is shown according to one embodiment of the present invention. In this embodiment, six different color stripes are used, i.e. Blue stripe, Yellow stripe, Magenta stripe, Green stripe, Red stripe and Cyan stripe. Other combination of color stripes can also be used depending on application requirements and environmental factors. The next step is to generate a sequence of the color stripes based on certain criteria. The main criterion is to construct a sequence of color stripes having a 'uniqueness' property that can be exploited in step 38 (FIG. 3) for image processing and pattern decoding processing. This uniqueness property will be described in details in subsequent paragraphs. The individual color stripes can be concatenated to produce a sequence of color stripes 42 as shown in FIG. 4a. In this example, every single color stripe is regarded as a distinctive element and is given a unique code (referred as first addressing code) to uniquely identify it. For example, they can be encoded by a numerical number that indicates the relative position of a color stripe in the sequence. Hence the blue stripe is labeled as '1' and the yellow stripe is labeled as '2' and so on. In another example, the color stripe is represented by a symbol, i.e. 'B' for the blue stripe, 'Y' for the yellow stripe; 'M' for the magenta stripe; 'G' for the green stripe; 'R' for the red stripe; 'C' for the Cyan stripe as shown in FIG. 4a. After assigning the first addressing codes to the elements, the sequence of color stripes 42 becomes an indexed sequence with identifiable property.

The indexed sequence can be projected onto an object for measuring the 3D shape of the object. However, using such an indexed sequence for projection may not obtain an accurate and reliable 3D model of the object since some color stripes boundaries may be missed if the object contains area with same color as the color stripes. In order to improve the accuracy and stability of the 3D measurement, the present invention inserts high contrast stripes at both sides of every color stripe in the indexed sequence to form an enhanced color sequence. The high contrast stripes are selected as having maximum color gradient to the color stripes in the indexed sequence and the reason for this is to maximize the contrast between the color stripes and the high contrast stripes so as to attain easy recognition and detection between each other. In the embodiment of FIG. 4b, white stripe (represented by symbol 'W') and black stripe (represented by symbol 'K') are chosen as the high contrast stripes for insertion. White stripe and black stripe are robust and stable for 3D measurement of many objects, especially for textured object. In one aspect, white stripe and black stripe are resistant to intensity change of background light, resulting in a more robust detection. In another aspect, white stripe and black stripe can be used to help recover the missed color stripes if necessary (described later).

An important step for measuring the 3D shape of an object is to detect the edges in captured image 30. In order to improve the detection result of the edges, the black and white strips are inserted into the sequence of color strips 42. For every color strip, a black or white strip is inserted into both sides of that color strip based on a maximum gradient criterion. The maximum gradient criterion used for selecting either a black stripe or white stripe to insert along both sides of a color stripe P is based on the equation below.

$$BW_{(r,g,b)} = \max \sum_{i \in (r,g,b)} |BW_i - P_i| \qquad \text{eq. (1)}$$

where P is a color stripe. In FIG. 4a, P∈{R,G,B,C,M,Y} BW∈{black, white}

According to this equation, the maximum gradient criterion performs the followings:

i) compute the absolute differences of each channel (R channel, G channel or B channel) of the color stripe P from the value of each corresponding channel of the white stripe and sum the absolute differences together to form an intermediate variable Sum1;

ii) compute the absolute differences of each channel (R channel, G channel or B channel) of the color stripe from the value of each corresponding channel of the black stripe and sum the absolute differences together to form an intermediate variable Sum2;

iii) if Sum1 has a greater value than Sum2, the white stripe is inserted into both sides of that color stripe; otherwise, the black stripe is inserted into both sides of that color stripe.

As an example, suppose the color stripe under insertion process is a blue stripe 41 as shown in FIG. 4b. Its RGB value is (0, 0, 255). According to the steps above, Sum1=(255+255+0)=510 and Sum2=(0+0+|-255|)=255. By comparing the values of Sum1 and Sum2, Sum1 has a greater value. Therefore, a white stripe 43 is inserted into each side of the blue stripe. The advantage of using such a maximum gradient criterion is that the contrast between adjacent stripes is maximized so that the boundaries of the stripes can be easily identified.

The insertion of white stripes and black stripes on both sides of a color stripe is referred as the first insertion. After the first insertion, there may be a situation that two identical high color contrast stripes (two white stripes or two black stripes) may be adjacent to each other, leading to a loss of the edge boundary therebetween. In order to solve this problem, the present invention further inserts a different high color contrast stripe to the middle of the two identical high color contrast stripes. This is referred as the second insertion. Referring now to FIG. 4b for illustration, a black stripe 46 is inserted to the right side of the yellow stripe according to maximum gradient criterion. Likewise, another black stripe 50 is inserted to the left side of the magenta stripe. These two black stripes would be adjacent together after the first insertion and the boundary between them cannot be distinguishable. In order to avoid the loss of edge boundary, a white stripe 48 is inserted between the black stripe 46 and the black stripe 50. Similarly, an additional black stripe is inserted between two consecutive identical white stripes if such situation occurs after the first insertion. When the second insertion step is done, an enhanced color stripe 44 with unique characteristic is generated.

For decoding purpose, every stripe in the enhanced color stripe 44 should be assigned a unique code for recognizing the position thereof. As mentioned before, the color stripes have been assigned first addressing codes. After the insertion steps, every white stripe or black stripe is given a unique second addressing code based on the first addressing codes. The coding method/algorithm used here is not important. Any known encoding methods that provide unique second addressing code can be used to define every stripe in the enhanced color stripe 44. An exemplary encoding method will be described below for demonstration.

In one embodiment where the color stripes are vertical stripes, the following encoding method is adopted. As shown in FIG. 4, the color strips are first assigned the first addressing codes, i.e. 1, 2, 3, ..., n, where n is the length of the color stripes. The inserted high color contrast strips are then encoded as second addressing codes based on the first addressing codes. The second addressing codes have the following format:

'nPCm'

Where n refers to the color stripe at the left of the inserted stripe;

m refers to the color stripe at the right of the inserted stripe;

P is either 'L' for left, 'R' for right or 'M' for middle and C is either 'K' for 'black' or 'W' for 'white', indicating that the inserted stripe is a black stripe or a white stripe.

In the above notation, P indicates the position of each high color contrast stripe within a group of high color contrast stripes (for example, a black stripe 46, a white stripe 48 and a black stripe 50 constitute a group of high color contrast section). 'L' means that the high color contrast stripe is at the left side of the group and 'R' means that it is at the right side of the group. 'M' means that the high color contrast stripe is in the middle of the group and this happens when second insertion occurs.

With this encoding algorithm, the three inserted black or white stripes 46, 48, and 50 in FIG. 4b are encoded as '2LK3', '2MW3' and '2RK3' respectively. Other black and white stripes in the enhanced color sequence 44 are encoded in a similar manner. At both ends of the enhanced color stripe 44, high color contrast stripes can be optionally inserted. The second addressing code can be simplified to "LEK", "LEW", "REK" or "REW", meaning "left end black", "left end white", "right end black" or "right end white" respectively.

With the first addressing codes and the second addressing codes, every stripe in the enhanced color sequence 44 can be uniquely identified. When the object to be measured contains a color pattern on its surface, the color stripes projected onto the object overlay on that color pattern. Since the color stripes of the captured image depend not only on the color stripes of the light pattern projecting onto the object, but also on the color absorption characteristic of the 3D object surface, they may show a different color from its original one due to color mixing. This may cause decoding errors in the subsequent image processing and decoding step (described later). The worst case is that the edge boundaries of a light stripe cannot be identified, leading to inability to compute the 3D coordinates of the object at that portion of the light stripe. If the light stripes (either a normal color stripe or a high contrast color stripe) in the vicinity of this problematic color stripe can be reliably decoded, the identity of the problematic color stripe can be resolved based on the unique addressing codes of nearby light stripes. The white stripes and black stripes are more robust against color patches on the object and can be reliably decoded. Hence, adding black and white stripes to the original color sequence can assist in recovery of the missed color stripes. Similarly, the decoded color stripes can also assist in recovering missing boundaries of black and white stripes, if they are missed.

Figure 5:
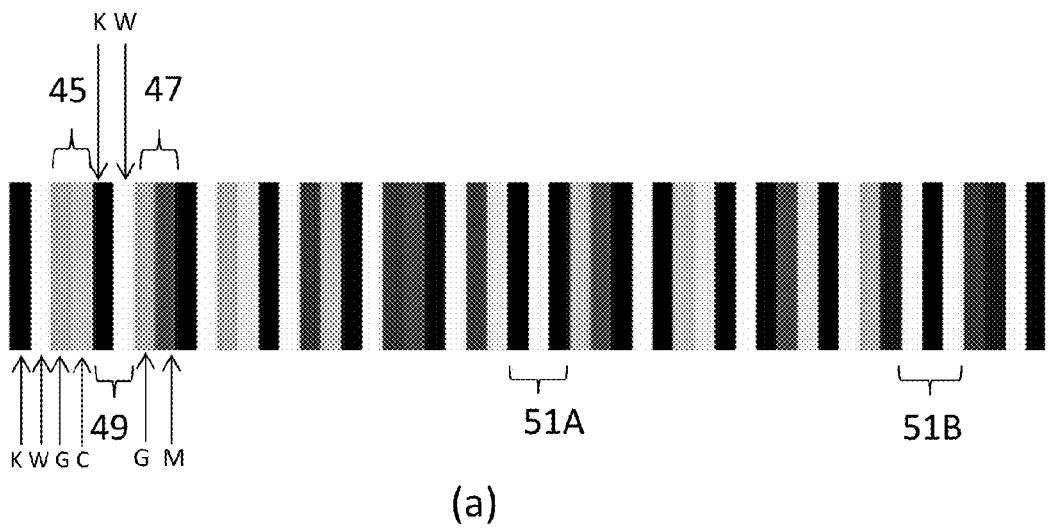
FIG. 5 shows other feasible implementations of the light pattern of the present invention.
Figure 5:
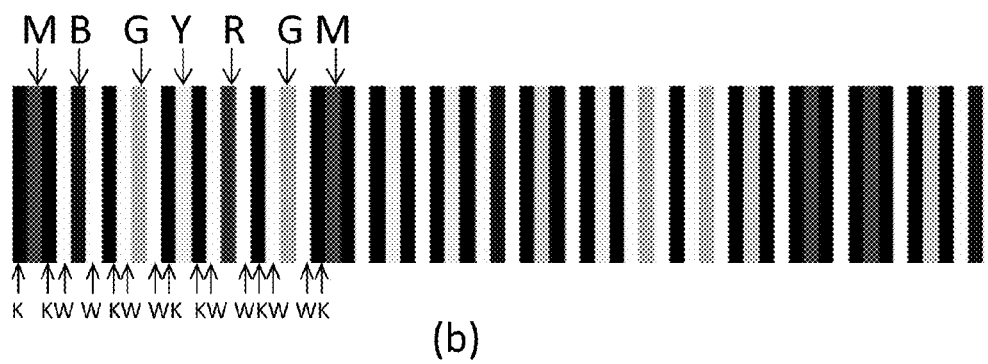

The light pattern in FIG. 4 is a basic implementation of the present invention. There are other feasible implementations but the concept is the same as mentioned above. The exemplary embodiment of FIG. 4 uses a single color stripe as an individual element. Now turning to FIG. 5, other feasible implementations of the light pattern is shown. More than one color stripes can be concatenated together to form an individual element (refer as a tuple hereafter) in a sequence of color stripes. For example, a green stripe and a cyan stripe can be grouped together to form a 2-tuple stripe 45 in FIG. 5a. And a red stripe and a magenta stripe can be grouped together to form another 2-tuple 47. High color contrast stripes such as black or white stripes can be inserted into both sides of each n-tuple in a similar manner (where n is the number of stripes in a tuple and n is varied due to different requirements and situations) based on the maximum gradient equation as mentioned above. In case two high contrast color stripes adjacent to each other are identical after the first insertion, a second insertion is needed by inserting a different high contrast color stripe in the middle to separate them. This is shown as the Black-White-Black triple 51A and White-Black-White triple 51B in FIG. 5a.

The encoding algorithm is the same as that described above. The difference is that a first addressing code is assigned to each tuple as a whole but not to a single color stripe within the tuple. For example, the tuple 45 is encoded as '1' and the tuple 47 is encoded as '2'. In this way, the inserted high contrast color stripes can also be assigned unique second addressing codes according to the aforementioned scheme.

It should be noted that in an n-tuple, the ordering of the color stripes is a distinguishing factor. A red-green 2-tuple is not the same as a green-red 2-tuple. The benefit of forming an n-tuple color sequence is that a much longer enhanced color sequence can be constructed from a limited set of colors. Obviously, when n is equal to one, the 1-tuple sequence degenerates to the color sequence similar to FIG. 4a.

In yet another embodiment, the sequence of color stripes can be generated from a De Bruijn sequence. A De Bruijn sequence D(K,N) of order N, is a cyclic sequence drawn from a set of K alphabets for which every possible subsequence of length N appears as a sequence of consecutive labels exactly once. An example of a D(3,3) De Bruijn sequence is shown below:

000100201101202102211121222(00)

Here the alphabets are {0,1,2} and the last two zeros in parenthesis indicates the wrap-around, circular nature of the sequence. They are actually the first two labels of the sequence. The length of this sequence is 27. It can be observed that any subsequence of length N (N=3 in this case) in this sequence occurs only once.

When decoding a De Bruijn color stripe sequence, a decoding error in one of the alphabets can be recovered by adjacent alphabets. As an example, assuming the $4^{th}$ position of the above sequence cannot be decoded, i.e.

000X00201101202102211121222(00)

X can be either 0, 1 or 2 (the alphabets of this sequence). It can be deduced that X cannot be '0' as the subsequence of length 3, {0,0,0} occurs to its left. It cannot be '2' either as the subsequence {0,0,2} occurs to its right. Hence it can only be '1' as subsequence {0,1,0} must occur and occur only once in this sequence.

This property is useful in 3D measurement. In one implementation, a De Bruijn sequence is used to generate a light pattern. The alphabets are the n-tuple color stripes. A sequence of color stripes based on the n-tuple color stripes can then be generated when K (the number of n-tuple) and N are determined. This De Bruijn sequence of color stripes can then be augmented with high contrast black and white stripes as discussed before to form a De Bruijn enhanced color sequence. The first addressing codes and the second addressing codes can also be similarly assigned. FIG. 5b shows an exemplary De Bruijn enhanced color sequence.

Figure 6:
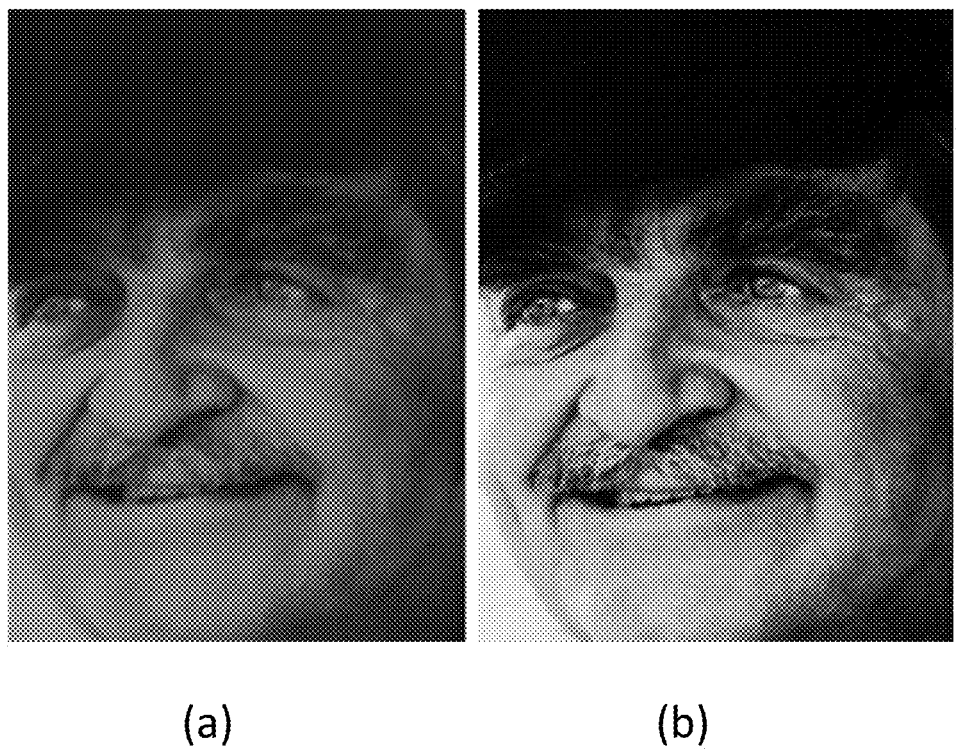
FIG. 6 is an example of the images taken by a color sensor and a monochrome sensor according to one embodiment.

In one embodiment, the sensing unit 28 in FIG. 2 uses a single color sensor to capture the image of the pattern projected object. In a further embodiment, the sensing unit 28 uses a hybrid sensor to attain acquisition of images. The hybrid sensor comprises a monochrome sensor and a color sensor for capturing monochrome images and color images respectively. Both the monochrome images and the color images are used to compute the 3D coordinates of the surface points of the object and thus the 3D shape thereof. In a further embodiment, the monochrome sensor and the color sensor have the same spatial resolution. An exemplary arrangement of the color sensor 66 is shown in FIGS. 7a and 7b. Here a mosaic of tiny color filters is placed over each pixel of the color sensor 66 so that each pixel is sensitive to only a specific color. In a further arrangement, a Bayer filter is adopted whereby a row of red and green sensors is followed by another row of green and blue sensors offset by one pixel position. The raw colored image is converted to a full-color image by a de-mosaicing algorithm. While a color sensor can be used to capture a black and white picture, the resultant quality is not as good as that of a picture taken by a monochrome sensor when the spatial resolution of the color sensor is the same as that of the monochrome sensor. FIG. 6 shows an example of the images taken by a color sensor and a monochrome sensor. FIG. 6a is a black and white image captured by a color sensor while FIG. 6b is a black and white image captured by a monochrome sensor. From the two images, it is clear that the black and white image captured by the monochrome sensor shows finer details and sharper contrast than that captured by the color sensor.

In one aspect of the invention whereby the high contrast color stripes are the white stripe and the black stripe, it is advantageous to use the aforementioned hybrid sensor to process the enhanced color sequence. The monochrome sensor detects the black and white stripes with higher quality while the color sensor processes the color stripes.

Figure 7:
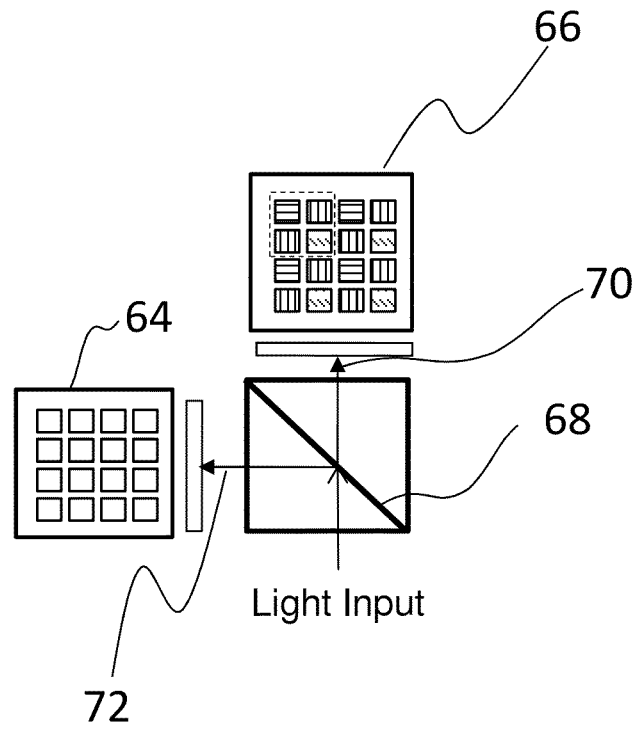
FIG. 7 shows two configurations of the hybrid sensor according to one embodiment of the present invention.
Figure 7:
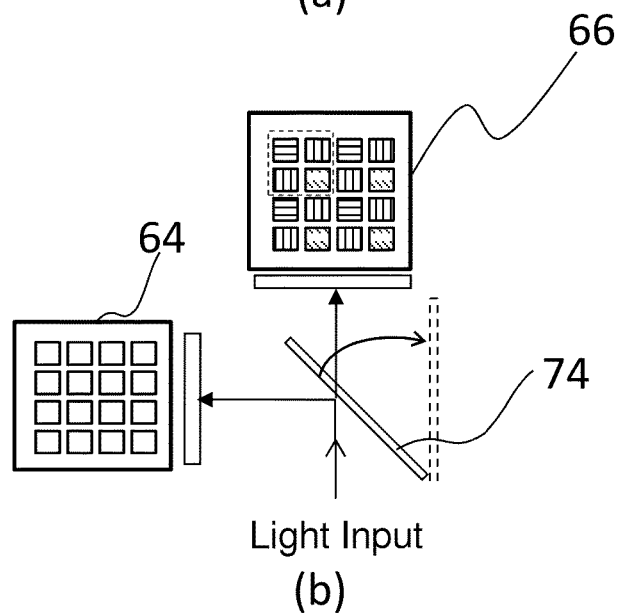

The hybrid sensor can be configured to operate in two modes, namely fast mode and precise mode. FIG. 7 shows the two configurations of the hybrid sensor. The hybrid sensor in FIG. 7a is operating in fast mode. As mentioned before, the hybrid sensor comprises a monochrome sensor 64 and a color sensor 66. In this fast mode, the hybrid sensor uses a beam splitter 68 to split the light input into a first beam 70 and a second beam 72 which are of the same intensity. The beam splitter 68 reflects half of the light input into the monochrome sensor 64 and transmits the other half of the light input into the color sensor 66. The position of the color sensor 66 and the monochrome sensor 64 can be swapped. The beam splitter 68 can be chosen to have different properties, for example, reflecting 60% of the light input and transmitting 40% of the light input or reflecting 70% of the light input and transmitting 30% of light input, . . . , etc. As the first beam 72 and the second beam 70 are separated from the same light input, they are synchronized and thus no calibration of the two beams is needed. Another advantage of using the beam splitter 68 is that the first beam 72 and the second beam 70 enter respectively into the monochrome sensor 64 and the color sensor 66 simultaneously. Hence a color image and a black and white image can be acquired concurrently.

FIG. 7b shows the configuration of the precise mode. The arrangement of the monochrome sensor 64 and the color sensor 66 is similar to that of the fast mode. The difference lies in that a folding mirror 74 is used to guide the light input to the monochrome sensor 64 or the color sensor 66. The folding mirror 74 fully reflects the light input to a desired direction. First, the folding mirror 74 reflects the light input into the monochrome sensor 64 so that the monochrome sensor 64 takes a black and white gray level image. Afterward, the folding mirror 74 is rotated so that the light input can emit to the color sensor 66 for capturing a color image. Similar to the fast mode, the position of the monochrome sensor 64 and the color sensor 66 can be swapped.

Figure 8:
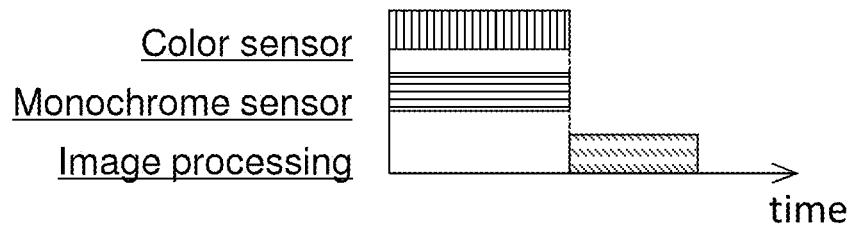
FIG. 8 is the timing diagrams of the fast mode of image acquisition and processing and the precise mode of image acquisition and processing, according to one embodiment of the present invention.
Figure 8:
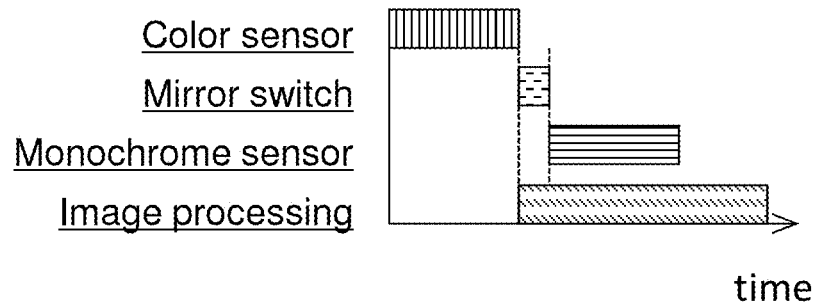

Referring now to FIG. 8, the timing diagrams of the fast mode and the precise mode are shown. As mentioned above, the color sensor 66 and the monochrome sensor 64 capture the images simultaneously in the fast mode and thus the overall processing time is shortened. The image acquisition step can be done in a "single shot" for the fast mode. For the precise mode, the overall processing time is longer since the color image and the black and white image are taken separately, as shown in FIG. 8b. The switching of the folding mirror also requires some time. However, the light input is not split so its full intensity is radiated to the sensors. Hence the precise mode produces images with higher brightness value but the overall processing time is longer when compared to the fast mode. On the other hand, both the fast mode and the precise mode have common characteristic. For example, the images taken by the color sensor and the monochrome sensor are totally overlapped since the two sensors share the same light input.

In the following paragraphs, the decoding processing/algorithm of the present invention will be described. The decoding steps are done in the processing unit as mentioned above. The processing unit comprises various components for performing different decoding steps, for example, an edge detection unit, a generation unit, an analysis unit and a measurement unit. An important step for decoding is to identify the edges between every stripe in the captured image. The captured image contains various stripes that are mostly the same as that of the enhanced color sequence projected onto the object. Now turning to FIG. 9, a flow chart of the decoding processing is shown. The processing unit first calculates the intensity gradient of every pixel of the captured image in step 76. In one implementation, it calculates the absolute difference of each color component intensity gradient (or color difference) of adjacent pixels. So for each pixel, the gradient values Diff_R, Diff_G, and Diff_B are obtained. If the stripes in the enhanced color sequence are in vertical direction, the processing unit performs pixel scanning along a horizontal direction (i.e. from left to right or from right to left). On the other hand, if the stripes in the enhanced color sequence are in horizontal direction, the processing unit performs pixel scanning along a vertical direction (i.e. from top to bottom or form from bottom to top). Theoretically, every gradient of all color channels should be zero for pixels inside the same stripe since those adjacent pixels are of the same color. At the boundary pixels between two adjacent stripes, at least one of the gradient values of the three channels is not zero. For easy recognition, the results of the gradients in every color channel are normalized in step 78. The normalization can be achieved by the following equation:

$$NorDiff\_X(i,j)=(Diff\_X(i,j)/max\_Diff\_X(i,j))*255$$

where X refers to the color channel (R, G, or B);

(i, j) is the coordinate of the pixel;

NorDiff_X(i, j) is the normalized color difference (or intensity gradient) between two adjacent pixels along a predetermined direction;

Diff_X(i, j) is the color difference (or intensity gradient) between two adjacent pixels along the predetermined direction;

max_diff_X(i, j) is the maximum color difference out of all the pixels along the predetermined direction;

After normalization, the normalized gradient value is in the range between zero and 255 for all color channels. However, this normalization step is optional.

Figure 9:
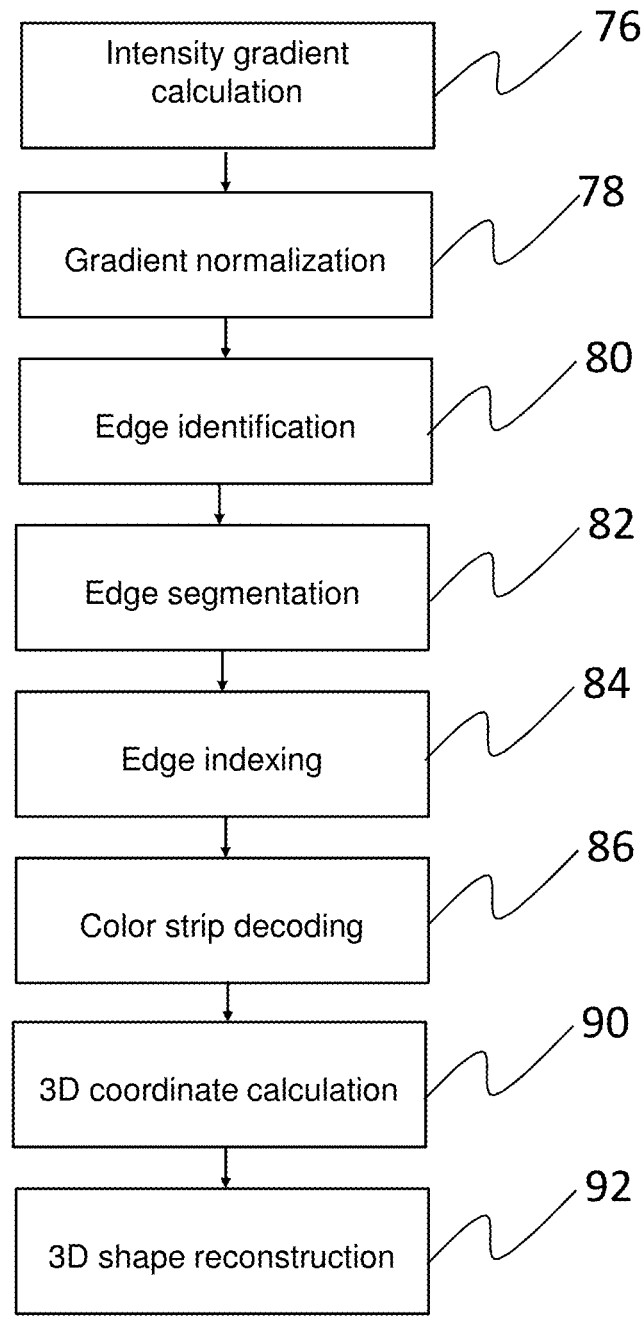
FIG. 9 is a flow chart of the decoding processing of the present invention.

Based on the normalized gradient, the edges in the captured image are identified in step 80 of FIG. 9. As mentioned above, every gradient value of all the channels should be zero for pixels inside the same stripe. In practice, the color of the stripes may be changed slightly due to external factors such as background light and color mixing. So their gradient values may not be zero but should be close to zero. Likewise, for the pixels at the edge boundary between two different color stripes, their gradient values may be slightly less than 255. Hence, an edge threshold is used to determine whether the pixel is an edge pixel or not. If one of the gradients of the three channels of a pixel is greater than the edge threshold, that pixel is identified as an edge pixel, otherwise it is not. An edge line can be obtained by jointing the edge pixels in a small neighborhood together via a contour line tracking algorithm.

Figure 10:
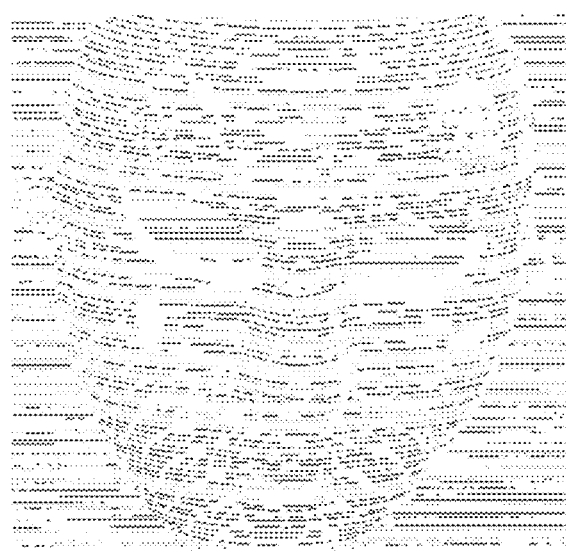
FIG. 10 shows an exemplary example of the edge boundary image according to one embodiment of the present invention.

Once all the edges in the captured image are identified, the processing unit performs edge segmentation in step 82. In this step, the processing unit will determine whether the edges are normal color edges or high contrast color edges. A normal color edge is the edge between two color stripes or between a color stripe and a high contrast stripe. A high contrast color edge is the edge between two high contrast stripes. The segmentation algorithm will be described later. Then in step 84, the processing unit first assigns a unique first index to every normal color edge and then it assigns a second index to every high color contrast edge based on the first index. By mapping the first indexes and the second indexes to the corresponding first addressing codes and the second addressing codes respectively in step 86, an association relationship between each edge in the captured image and that in the original enhanced color sequence is obtained. An exemplary example of the edge boundary image is shown in FIG. 10. It can be seen that many edge lines are present in FIG. 10. However, these lines are not straight since the light stripes projected on the object are deformed by the 3D shape of the object. However, a rough shape of the object can be seen.

Every line in the image of FIG. 10 corresponds to a boundary of the original enhanced color sequence. Based on the association relationship, every edge boundary in the captured image can be linked to a corresponding edge boundary of the original enhanced color sequence. Due to the 3D shape of the object, some pixels of the edges in the captured image are shifted when compared to their corresponding pixels of the edges in the projection image of the original enhanced color sequence. The shifted distance between two corresponding pixels of the two images is the deviation caused by the 3D shape of the object. The 3D coordinates of the surface points of the object can be calculated based on the deviation in step 90. Finally, the 3D shape of the object can be reconstructed by the 3D coordinates in step 92.

Figure 11:
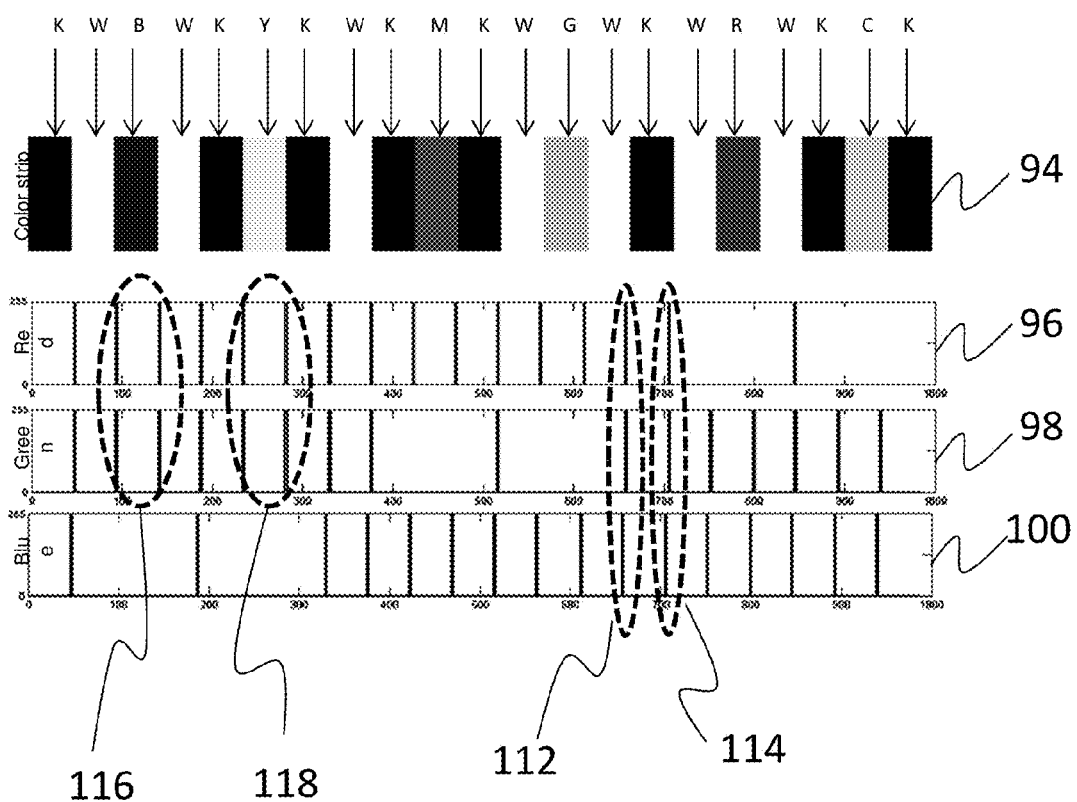
FIG. 11 is a diagram illustrating the edge segmentation according to one embodiment of the present invention.

Now referring to FIG. 11, a diagram illustrating the edge segmentation is shown. A 1-tuple enhanced color sequence 94 is used as a specific example to explain the concept of edge segmentation. The rows 96, 98 and 100 represent the intensity gradients (color differences) of the Red channel, the Green channel and the Blue Channel respectively. In this example, there are six color stripes, i.e. Blue stripe (0, 0, 255), yellow stripe (255, 255, 0), magenta stripe (255, 0, 255), green stripe (0, 255, 0), red stripe (255, 0, 0) and cyan stripe (0, 255, 255). The high contrast color stripes used are black stripe (0, 0, 0) and white stripe (255, 255, 255). Based on the color stripes and the high contrast color stripes selected, the intensity gradients (or color differences) of each channel are either 0 or 255 in the absence of noise and other external factors. The vertical bar in each of the color channel indicates the position where the edge occurs, i.e. where the gradient value Diff_X (X=R, G, or B) has a value of 255. At an edge position, if all the gradient values of the three channels are 255, the edge is identified as a black and white edge, for example, the edges 112 or 144 in FIG. 11. If the gradients of two channels are 255 and the gradient of the remaining channel is 0, the edge is identified as color edge. This can be easily seen from the diagram in FIG. 11. Notice that by just examining the Diff_X values, it is not possible to distinguish whether the edge 112 is a white-to-black transition edge or the edge 114 is a black to white transition edge. In order to know whether the stripe between edges 112 and 114 is a black stripe, the color value within the stripe is examined. This is also true for identifying the color stripes. For example, the blue stripe produces a pair of color edges 116 in the red and green channels but not in the blue channel. So is the yellow stripe. It produces an identical pair of color edges 118 too. In order to know the color of the stripe, the value of a color channel having zero color difference is examined.

Figure 12:
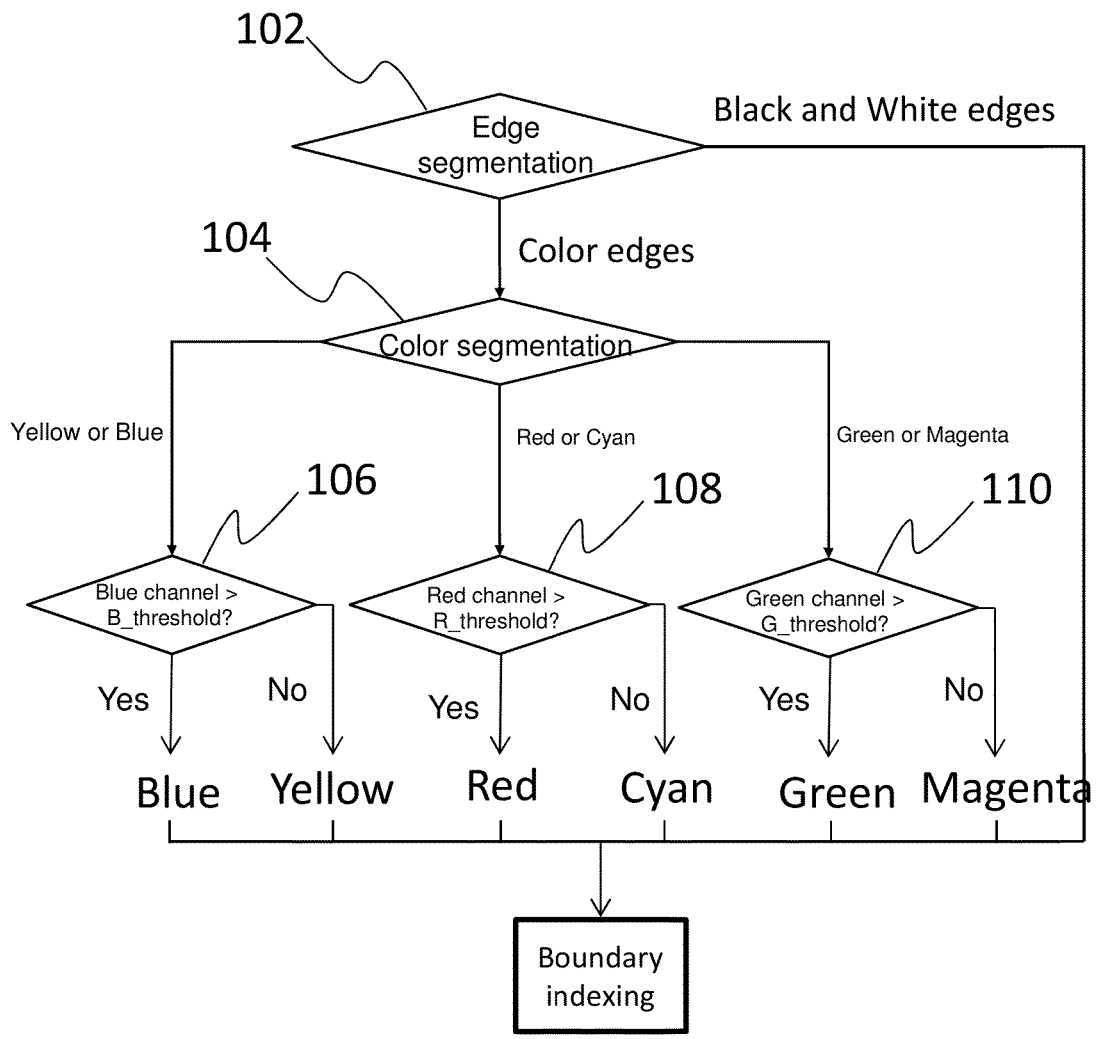
FIG. 12 is a flow chart of edge segmentation according to one embodiment of the present invention.

The flow chart shown in FIG. 12 further shows how this ambiguity is resolved. First, black and white edges and the color edges are separated in step 102. In practical situation, this is done by examining if all the gradient values of the three channels are close to 255 as mentioned before. In step 104, the color edges are further determined whether it is a blue edge or a yellow edge; a red edge or a cyan edge; and a green edge or a magenta edge. For the first group (blue or yellow), the gradient values of the red channel and the green channel should have a value close to 255 but the blue channel has a value close to zero. To further distinguish whether the stripe is a blue stripe or a yellow stripe, the color value at the blue channel is examined in step 106. If its value is higher than a predetermined threshold B_threshold, then it is identified as a blue stripe. Otherwise, it is a yellow stripe. In a similar manner, the red or cyan ambiguity is resolved in step 108 while the green and magenta ambiguity is resolved in step 110. In one embodiment, the respective B_threshold, R_threshold and G_threshold are set to a value close to the middle of the range between 0 and 255, i.e. a value of 127.

Having identified the color of the stripe, the first addressing code of the stripe can be determined. This is because the ordering of color stripes in the enhanced color sequence is known. Afterwards, the second addressing code of the high contrast stripes (in this example, they are the black stripe or the white stripe) can also be determined.

The above example explains the basic concept of the decoding procedure using the enhanced color sequence as shown in FIG. 11 as an example. If different colors are used to create the color stripes, or the high contrast stripe is different from black stripe and white stripe, the decoding procedure is likely to be different. Moreover, for the case that a hybrid sensor is used, both the color image and the black and white image taken are used for decoding purpose. The black and white edges are determined from the black and white image while the color edges are determined from the color image. Because the edges between the black and white stripes detected by the monochrome sensor are clearer and sharper than those detected by the color sensor, a better performance can be attained if the 3D model is reconstructed by these edges. The accuracy is higher and more number of 3D points can be obtained. In one embodiment, the two images captured by the hybrid sensor are combined together to generate the 3D model of the object. In another embodiment, black and white edges detected from the monochrome image are used to reconstruct the 3D model while the color edges detected from the color image are used to smooth out and refine the 3D model. When n-tuples are used to construct the enhanced color sequence, the decoding procedure may be also different. However, the basic concept is the same as explained above.

Figure 13:
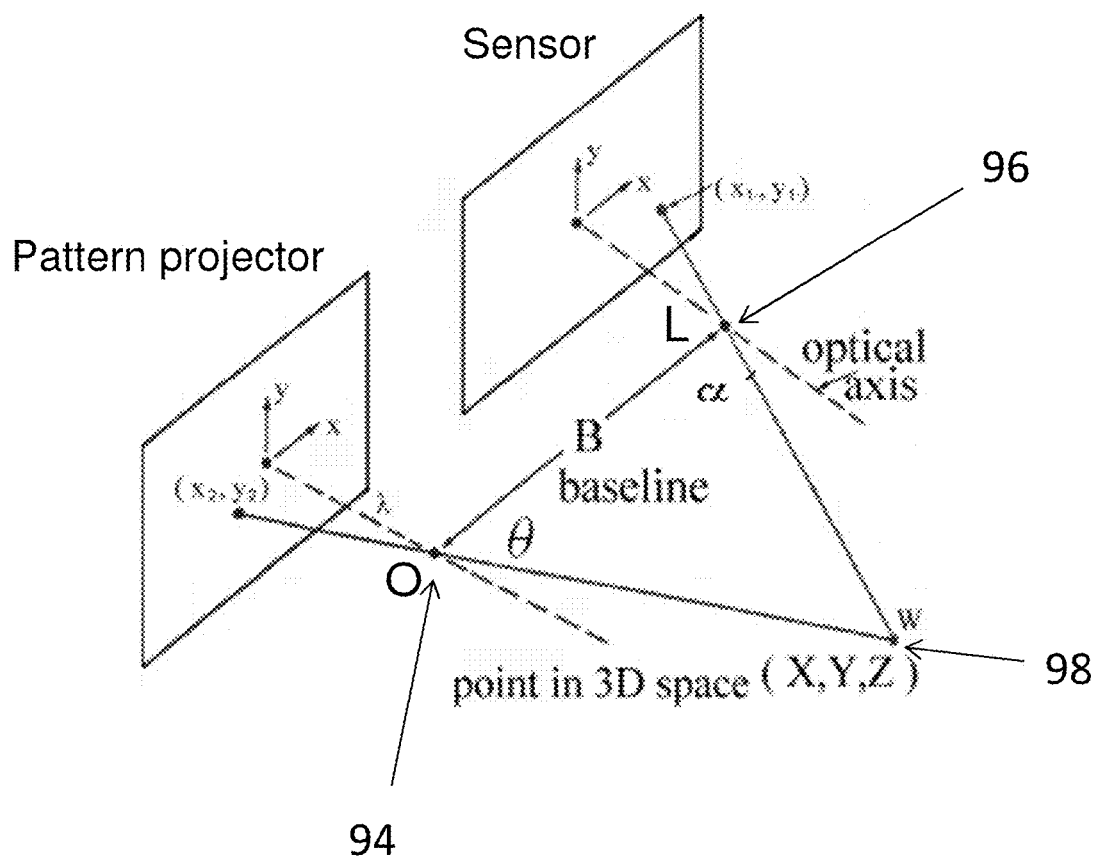
FIG. 13 shows the concept of triangulation calculation according to one embodiment of the present invention.

With the association between an edge point in the captured image and the corresponding edge point in the projected image known, the 3D coordinate of the object at that point can be readily obtained. In one implementation of step 90, triangulation method is used. Referring to FIG. 13, when a light ray originates from point O 94 hits a point W 98 of an object and reflects back to point L 96 of the image sensor, the height of point W can be calculated by the equation below:

$$Z = B\frac{\sin(\theta)\sin(\alpha)}{\sin(\theta + \alpha)} \qquad \text{eq. (2)}$$

where Z is the Z-coordinate of the object surface point
B is the distance between point O 94 and point L 96;
$\theta$ is the angle between line OW and the base line;
$\alpha$ is the angle between line LW and the base line.

In one implementation, Point O is related to an edge pixel in the projection image and Point L is related to a corresponding edge pixel of same edge boundary in the captured image. The height of the surface point W can then be calculated by the triangulation principle.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the shape of the stripes can be varied. In addition to straight stripes, curved stripes may be used. Different width and different number of the stripes can be selected according to different requirements. For the hybrid sensor used, a color sensor and a monochrome sensor can be integrated into a single unit. However, two individual sensors can be used to implement the hybrid system.

Even though black stripe and white stripe are used to represent high contrast color stripe in many embodiments as discussed above, other color pairs may also be used. As an example, the high contrast stripes can be the pair of a blue stripe and a yellow stripe. In this case, the normal color stripe does not contain blue color and yellow color.

In a further embodiment, the inventive ideas can be extended whereby high contrast stripes can have more than two elements.

What is claimed is:

1. A computer-implemented method for measuring a three-dimensional object, comprising:
   a) projecting an enhanced color stripe onto said object by a projection unit, wherein said enhanced color stripe is generated by a pattern generation unit comprises the steps of:
      (i) generating at least one distinctive tuple by concatenating at least one color stripe together, each said distinctive tuple being different from each other;
      (ii) forming a sequence of color stripes by using said at least one distinctive tuple based on a predetermined rule;
      (iii) providing a plurality of different high contrast color stripes having a relatively high color contrast to each said color stripe of said at least one distinctive tuple;
      (iv) for each end of each said distinctive tuple:
         (1) determining color gradients between a color stripe at said each end and each of said plurality of different high contrast color stripes;
         (2) selecting one of said plurality of different high contrast color stripes for said each end, wherein each said selected high contrast color stripe has the maximum color gradient to the color stripe at said each end among said determined color gradients;

(3) inserting the selected high contrast color stripe to said each end;

(v) identifying a plurality of repetition positions, each said plurality of repetition positions being a middle of two consecutive identical high contrast color stripes; and (vi) further inserting a high contrast color stripe different from said two consecutive identical high contrast color stripes from said two high contrast color stripes into said plurality of repetition positions to form said enhanced color sequence, b) capturing at least one image of said enhanced color stripe reflected from said object by a sensing unit; and c) determining said three-dimensional shape of said object based on said at least one image by a processing unit;

(i) identifying edges in said at least one image based on color transitions of said at least one image by an edge detection unit;

(ii) comparing said edges with corresponding edges in said enhanced color sequence and determining depth deviation there between by an analysis unit; and (iii) measuring said three-dimensional shape of said object based on said depth deviation by a measurement unit.

2. The method of claim 1 further comprising:

a) giving a unique first addressing code to each said at least one distinctive tuple in said sequence of color stripes; and b) giving a unique second addressing code to each high contrast color stripe in said enhanced color sequence based on said unique first addressing code.

3. The method of claim 1, wherein said predetermined rule is De Bruijn sequence.

4. The method of claim 1, wherein said at least one color stripe is selected from a pool of color stripes; each said color stripe from said pool having different color spectrum but does not contain the color of said plurality of different high contrast color stripes.

5. The method of claim 4 wherein said plurality of different high contrast color stripes are white stripe and black stripe respectively.

6. The method of claim 1, wherein said identifying step further comprises the step of identifying normal color edges of said at least one distinctive tuple and high contrast color edges of said plurality of different high contrast color stripes based on a segmentation algorithm.

7. The method of claim 6, wherein said comparing step further comprises the step of assigning a first index to every said normal color edge, and assigning a second index to every said high contrast color edge based on said first index.

8. The method of claim 7, wherein said comparing step further comprises the step of mapping said first index and said second index to corresponding said first addressing code and said second addressing code respectively to obtain an association relationship, said depth deviation being determined based on said association relationship.

9. A system for measuring three-dimensional shape of an object by using an enhanced color stripe, comprising:

a) a pattern generation unit configured to generate said enhanced color stripe;

b) a projection unit configured to emit said enhanced color stripe onto said object;

c) a sensing unit configured to capture at least one image of said enhanced color stripe reflected from said object; and d) a processing unit configured to determine said three-dimensional shape of said object based on said at least one image, wherein said enhanced color stripe comprises (i) at least one distinctive tuple, each said at least one distinctive tuple being generated by concatenating at least one color stripe together; and (ii) a plurality of high contrast color stripes having a relatively high color contrast to each said color stripe in said at least one distinctive tuple, wherein said plurality of high contrast color stripes have at least two different colors, wherein one of said plurality of high contrast color stripes is inserted in each side of each said at least one distinctive tuple and is selected to have the maximum color gradient to a color stripe at a corresponding end of each said distinctive tuple among the color gradients determined by comparing a color stripe at said corresponding end and each of said plurality of high contrast color stripes; and in a middle of two consecutive identical high contrast color stripes, a high contrast color stripe different from said two consecutive identical high contrast color stripes in said plurality of high color contrast stripes is inserted e) an edge detection unit for identifying edges in said at least one image based on color transitions of said at least one image;

f) an analysis unit for comparing said edges with corresponding edges in said enhanced color sequence and determining depth deviation there between; and g) a measurement unit for measuring said three-dimensional shape of said object based on said depth deviation.

10. The system of claim 9, wherein said plurality of high contrast color stripes in said enhanced color stripe comprises a white stripe and a black stripe.

11. The system of claim 10, wherein said sensing unit comprises a color sensor for capturing a color image of said enhanced color sequence reflected from said object and a monochrome sensor for capturing a monochrome image of said enhanced color sequence reflected from said object.

12. The system of claim 11, wherein said sensing unit further comprises a beam splitter for splitting light reflected from said object into a first beam and a second beam, and directing said first beam onto said color sensor and directing said second beam onto said monochrome sensor.

13. The system of claim 11, wherein said sensing unit further comprises a folding mirror for first guiding light reflected from said object onto said monochrome sensor and then guiding said light reflected from said object onto said color sensor.

14. The system of claim 9, wherein each said at least one distinctive tuple is given a unique first addressing code and each said plurality of high contrast color stripe is given a unique second addressing code based on said unique first addressing code.

15. The system of claim 14, wherein said edge detection unit further comprises an identification unit for identifying normal color edges and high color contrast edges based a segmentation algorithm.

16. The system of claim 15, wherein said analysis unit assigns a first index to every said normal color edge, and assigns a second index to every said high color contrast edge based on said first index.

17. The system of claim 16, wherein said analysis unit maps said first index and said second index to corresponding said first addressing code and said second addressing code respectively to obtain an association relationship, said depth deviation being determined based on said association relationship.

18. The system of claim 15, wherein at least one distinctive tuple of said enhanced color sequence is concatenated based on De Bruijn sequence.

19. The system of claim 15, wherein said at least one color stripe of said enhanced color sequence comprises a blue stripe, a green stripe, a cyan stripe, a red stripe, a magenta stripe and a yellow stripe; said plurality of high contrast color stripes comprising a white stripe and a black stripe.

* * * * *